United States Patent [19]

Polson

[11] Patent Number: 4,747,911
[45] Date of Patent: May 31, 1988

[54] APPARATUS FOR MEASURING DIAGONAL AND SIMPLEX PAPER CURL

[75] Inventor: Alvin K. Polson, Richland, Wash.

[73] Assignee: Boise Cascade Corporation, Boise, Id.

[21] Appl. No.: 922,394

[22] Filed: Oct. 23, 1986

[51] Int. Cl.⁴ ............................................. G01B 11/24
[52] U.S. Cl. ................................... 162/263; 356/371; 356/376; 356/387
[58] Field of Search ................ 162/263; 356/371, 386, 356/387, 376

[56] References Cited

U.S. PATENT DOCUMENTS

| | | | |
|---|---|---|---|
| 3,481,194 | 12/1969 | Sivilotti et al. | 73/144 |
| 3,604,940 | 9/1971 | Mathews | 356/386 |
| 3,688,571 | 9/1972 | Atkins et al. | 73/144 |
| 4,322,971 | 4/1982 | Strobel | 73/159 |
| 4,332,477 | 6/1982 | Sato | 356/371 |
| 4,650,334 | 3/1987 | Alster et al. | 356/376 |

FOREIGN PATENT DOCUMENTS 960374  6/1964 United Kingdom .
2129932 5/1984 United Kingdom ................ 356/386

OTHER PUBLICATIONS

Paper Curl and Shrinkage Tester (Gurley-Witham No. 4140) Nov. 15, 1941.

*Primary Examiner*—Steve Alvo
*Attorney, Agent, or Firm*—Laubscher & Laubscher

[57] ABSTRACT

A method and apparatus for measuring the curl in a vertically suspended sheet of paper is disclosed. A pair of spaced horizontal laser beams is directed through a pair of collimating lenses to produce laser beams having a given width. The collimated beams are directed against the upper and lower side edges of the sheet in a direction parallel with the planar face of the sheet. The shadow images cast from the interruption of the pair of beams by the upper and lower edges of the sheet are detected and compared, with the difference between the images corresponding with the diagonal curl of the paper sheet.

4 Claims, 3 Drawing Sheets

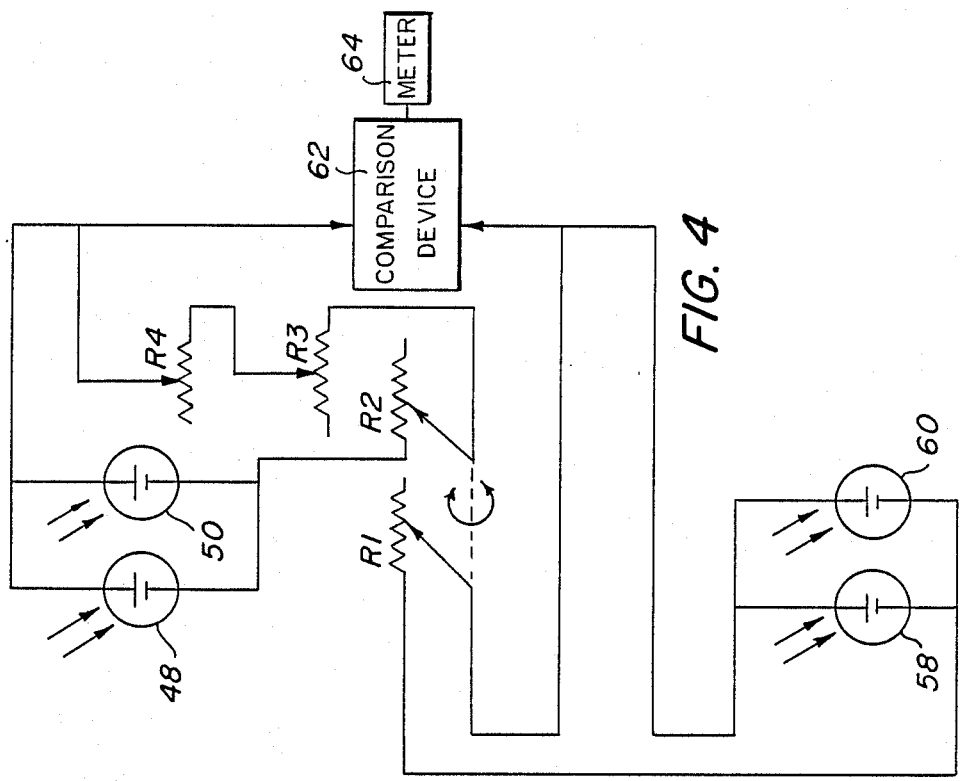
FIG. 4
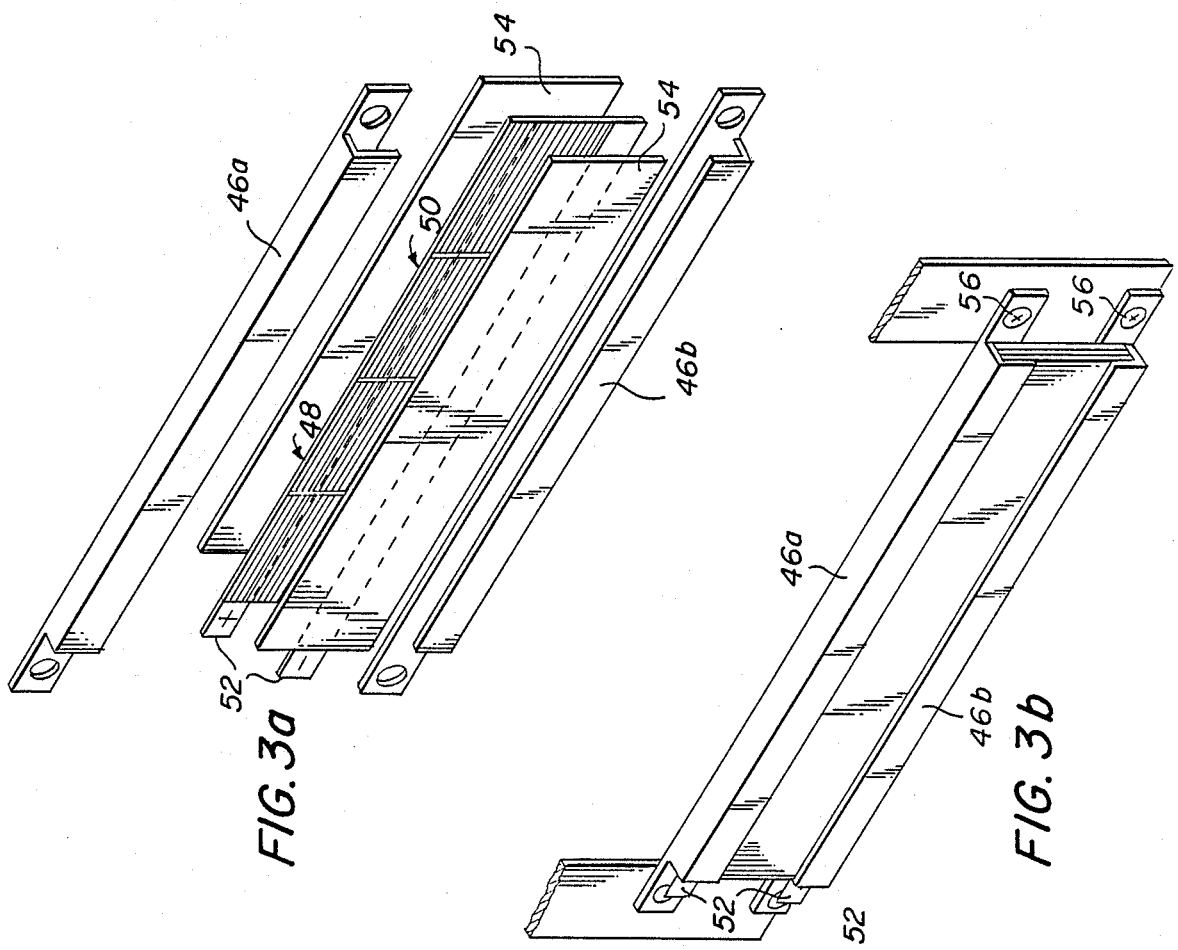
FIG. 3a
FIG. 3b

APPARATUS FOR MEASURING DIAGONAL AND SIMPLEX PAPER CURL

BACKGROUND OF THE INVENTION

In the manufacture of sheets of paper, and especially the manufacture of xerographic copy paper, it is desirable to test the paper for curl in order to determine that the paper is of a desired flatness. Generally, two types of curl may arise in paper manufacture as a result of moistening or drying a paper sheet. Simplex or basic curl is that which arises in one direction, such as results when a sheet of paper is rolled into a cylindrical tube. Diagonal curl is the result of a twist in a sheet of paper. For example, if the top edge of a sheet of paper is axially rotated in one direction and the bottom edge of the sheet is axially rotated in the opposite direction, the twist in the paper will produce a diagonal curl.

Current curl determination during paper production is generally performed manually and suffers from subjective variables owing to different determinations from competent testing personnel. Such things as a dominant eye, minor astigmatism, or the height of an individual tester are all variables that affect curl testing results.

The present invention relates to a unique method and apparatus for opto-electrically measuring the curl in a suspended sheet of paper to provide reliable, uniform test results.

BRIEF DESCRIPTION OF THE PRIOR ART

It is known in the art to measure simplex curl in a sheet of paper. For example, British Pat. No. 960,374 discloses a method and apparatus for measuring the curl in a paper web wherein light beams are directed against the opposed sides of a strip of the web and the light reflected from the strip provides an output indicative of the curl of the strip. Also known in the art is the Gurley-Witham curl and shrinkage testing instrument for optically testing the curl or shrinkage of paper when it is dried or moistened. A sheet of paper to be tested is placed on a heated metal plate and pushed into a path of parallel rays of light. The shadow from the curled sheet is cast upon a translucent screen where it is ruled and numbered to determine curl and shrinkage.

While the prior devices operate satisfactorily for determining simplex curl, they are incapable of measuring diagonal curl or twist, which is a severe drawback with current high speed production of copy paper and the like. Furthermore, the prior devices also require some manual input in formulating the test results which tends to diminish the accuracy of the curl measurements.

The present invention was developed in order to overcome these and other drawbacks of the prior devices by providing a method and apparatus for accurately measuring both simplex and diagonal curl in a sheet of paper.

SUMMARY OF THE INVENTION

Accordingly, it is a primary object of the present invention to provide a paper simplex and diagonal curl measuring device including a laser generator and line splitting device for generating a pair of parallel, vertically spaced beams of light of similar intensity. A pair of collimating lenses are arranged in the light paths of the spaced beams of light, respectively, for producing laser beams having a given width and for directing the laser beams against vertically spaced side edge portions of a vertically suspended sheet of paper. The paper sheet whose planar face extends in the direction parallel to the laser beams thus interrupts at least a portion of each beam to cast two shadows in the light images. Solar cells are arranged adjacent the sheet of paper on the opposite side thereof relative to the laser generator and collimating lenses for detecting the light images cast by the beams. The detected images are converted to a readable digital format and compared. The difference between the digital readout of the images corresponds with the diagonal curl of the sheet of paper.

According to a more specific object of the invention, an image processing circuit is connected with the solar cells for converting the light images to digital form.

It is yet another object of the invention to provide a compensation device in the electrical circuit to compensate for simplex curl in each of the light images.

BRIEF DESCRIPTION OF THE FIGURES

FIGS. 3a and 3b are exploded and assembled perspective views, respectively, of a solar cell according to the invention; and FIG. 4 is a schematic diagram of an image processing circuit according to the invention.

DETAILED DESCRIPTION

Figure 1:
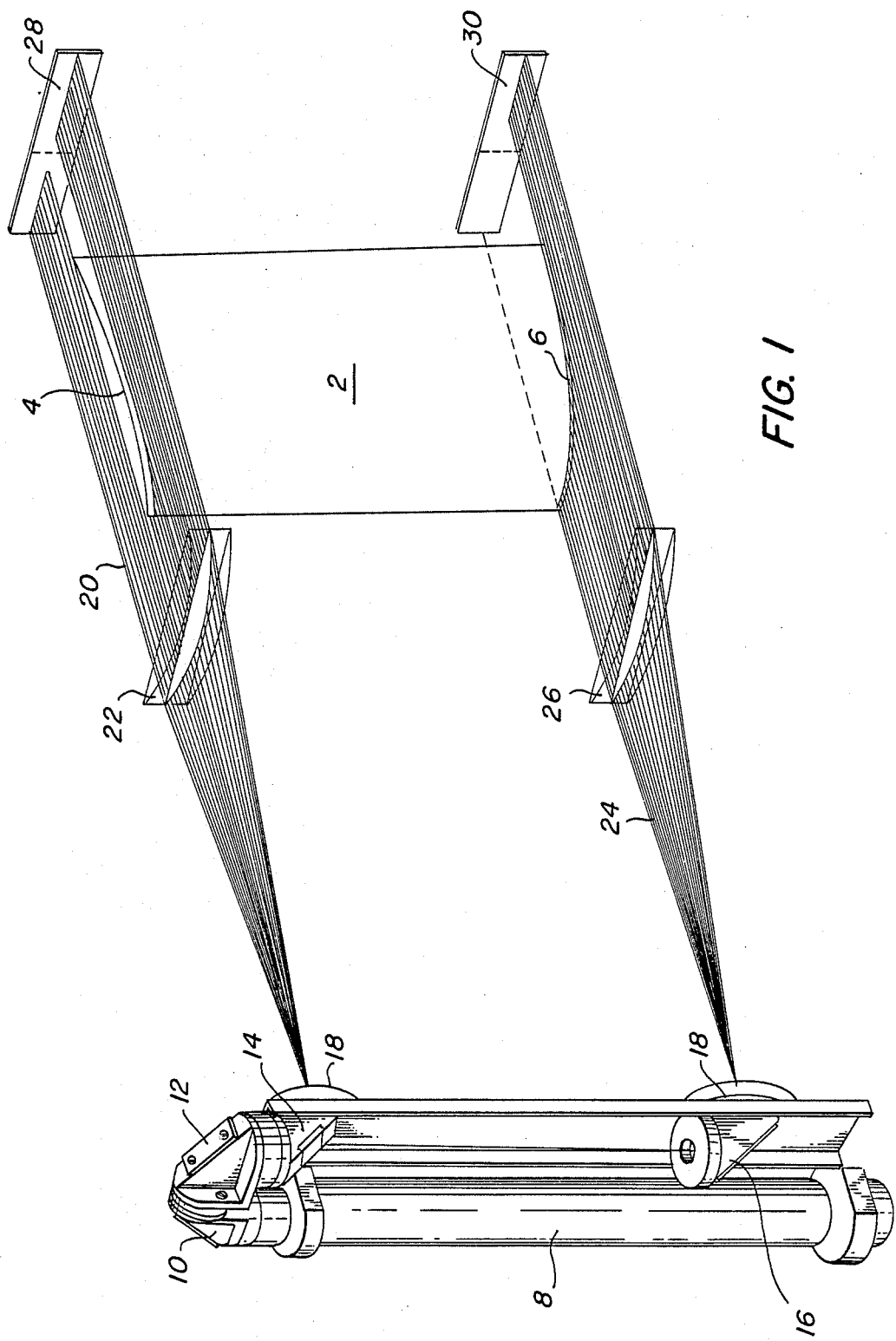
FIG. 1 is a perspective view illustrating the light images cast by a vertically suspended sheet of paper which interrupts a pair of light beams.

Referring first to FIG. 1, the basic apparatus for measuring the curl of a sheet of paper is shown. The paper sheet 2 is vertically suspended from its upper edge 4 by any suitable conventional means such as a plurality of vacuum suction nozzles (not shown). The lower edge 6 of the sheet hangs freely.

A laser generator 8 is provided for generating a laser beam used for curl measurement. Although any suitable light source may be used, a low energy helium neon laser with a remote power supply such as that manufactured by Siteline, Inc. is preferred. First and second right angle reflector assemblies 10, 12 are connected with the output of the laser generator for reversing the laser beam direction by 180° to save space and to allow the laser to be mounted in a fairly compact instrument as will be discussed with reference to FIG. 2.

A beam splitter 14 such as a 2LM-FP line splitter is connected with the second reflector 12 for splitting the reflected laser beam into two beams of equal intensity at 90° to each other, one of the beams being directed horizontally and the other of the beams being directed vertically. A third right angle assembly 16 reflects the vertically directed laser beam horizontally, whereby two parallel spaced horizontal beams are generated as shown in FIG. 1. The spacing between the beams is controlled by the spacing of the third reflector 16 from the beam splitter 14 in accordance with the length of the sheet of paper whose curl is being measured, as will be set forth in greater detail below. Each beam passes through a line maker 18 which converts each beam from a cylindrical configuration to a spreading fan-shaped configuration as shown in FIG. 1.

The upper beam 20 passes through a first collimator lens 22 and the lower beam 24 passes through a second collimator lens 26, whereby each beam is converted to a uniform given width.

Behind the lenses 22 and 26, the sheet of paper to be tested is suspended with its planar face extending parallel to the beams. An optimum measurement of curl results when the upper beam 20 crosses the upper edge 4 of the sheet of paper and the lower beam 24 crosses the lower edge 6 of the sheet of paper.

Since the paper interrupts the upper and lower beams, a shadow is cast behind the paper, the shadow being defined by the light images resulting from the uninterrupted portions of the beams. An upper solar detector 28 is provided behind the sheet 2 for receiving the light image cast from the upper beam 20 and a lower solar detector 30 is provided for receiving the light image cast from the lower beam 24.

Figure 2:
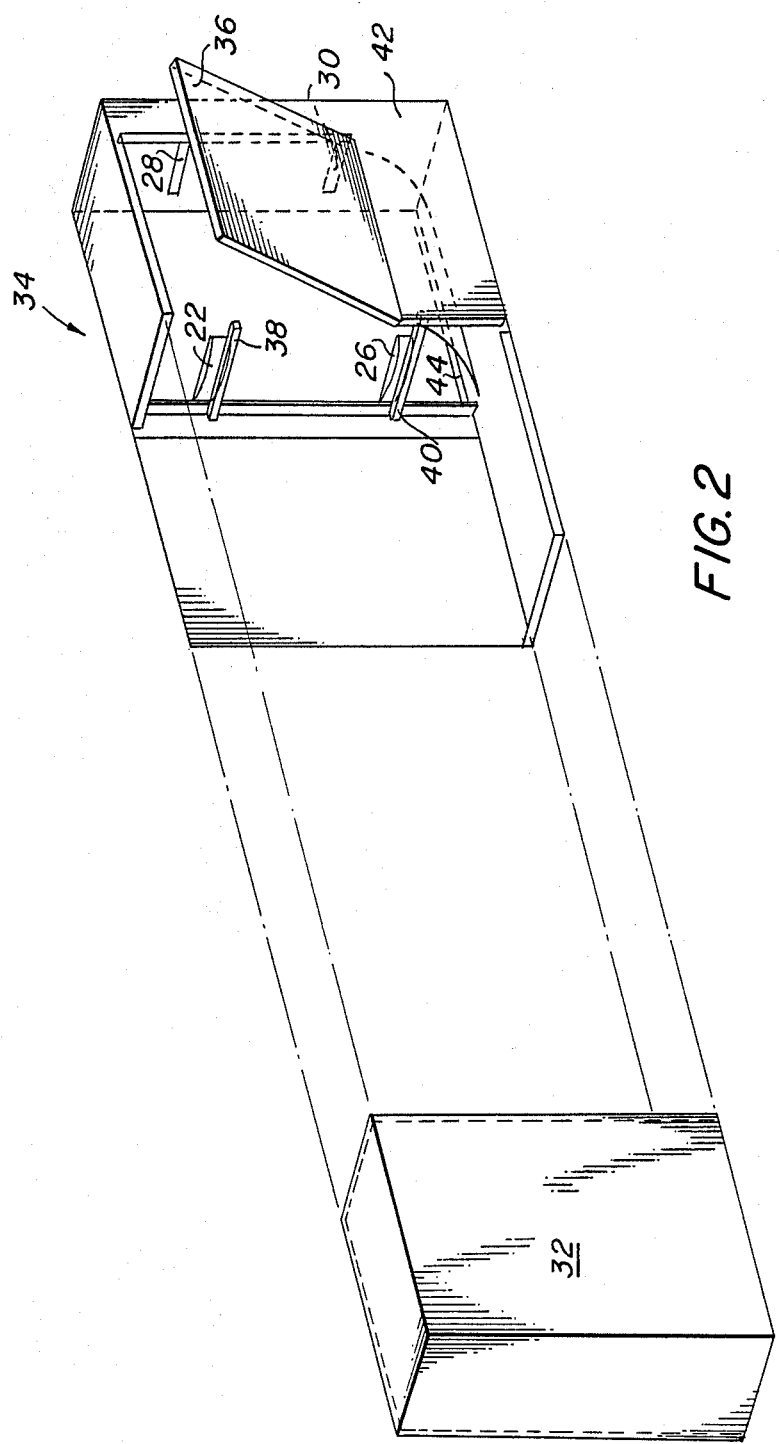
FIG. 2 is an exploded perspective view of a housing for supporting the optical components of the curl measuring device according to the invention.

Referring now to FIG. 2, a two-piece housing for the curl measuring device is shown. An optical component compartment 32 is provided for mounting the laser generator, first and second reflectors and beam splitter in a fixed orientation, with the third reflector and lower line makers vertically adjustable relative to the splitter and upper line maker in accordance with the height of the sheet being tested. The optical compartment is slidably connected with a testing compartment 34 containing a door 36 in one front wall thereof affording access to the interior of the testing compartment. An upper support 38 has the upper collimator lens 22 mounted thereon and a lower support 40 has the lower collimator lens 26 mounted thereon. The lower lens support 40 is vertically adjustable relative to the housing in accordance with the height of the sheet of paper being measured.

With the door open, the paper sheet is attached at its upper edge to a conventional vacuum device (not shown) behind the lenses 22 and 26. The sheet is mounted with its planar face extending generally parallel with the door 36, whereby one side edge of the sheet extends toward the lenses while the other side edge of the sheet extends toward the side wall 42, which preferably has the solar detectors 28 and 30 mounted thereon. The lower detector is vertically adjustably mounted on the side wall for vertical positioning in accordance with the height of the sheet.

With the sheet mounted within the compartment 34, the lower reflector and line maker within the optical compartment, the lower lens support, and the lower solar detector are all adjusted to direct the lower laser beam 24 across the lower edge of the suspended sheet, and the optical compartment 32 is connected with the testing compartment 34. The laser generator is then activated and the split laser beams generate light images on the solar detectors in accordance with the configuration of the sheet portion interrupting each beam. Following testing, the vacuum is deenergized and the sheet drops through an exit chute 44 from the compartment.

The construction of each solar detector will be described more particularly with reference to FIGS. 3a and 3b. Each detector includes a two-piece aluminum frame having sections 46a and 46b. Each detector is made from two 2.5×5 cm solar cells 48, 50 such as those manufactured by Radio Shack as catalog No. 276-124 electrically connected in parallel with metallic strip connectors 52, whereby the cells respond as one 2.5×10 cm solar detector. Although two solar cells are shown and described, preferably only a larger single cell is used for simpler manufacturing and maintenance. The solar cells 48, 50, metallic strip connectors 52, and two strips of synthetic plastic material 54 are sandwiched together and held within the aluminum frame with sufficient pressure to insure electrical contact. The metallic strip connectors protrude from the end of the frame to define terminal connectors. Each detector thus produces an electrical current output corresponding with the light image detected by the solar cells. The detector assembly is connected with the compartment side wall by fastening devices such as screws 56 passing through openings in the sections 46a and 46b in the aluminum frame.

The solar cells of each detector are electrically connected in an electrical circuit as shown in FIG. 4. The electrical circuit includes the solar cells 48, 50 from the upper detector 28, the solar cells 58, 60 from the lower detector 30, potentiometers $R_1$ and $R_2$, and trimmer resistors $R_3$ and $R_4$ for adjusting the circuit relative to a reference for compensation of simplex curl.

More particularly, the electrical circuit of FIG. 4 has its outputs connected with a comparison device 62 and multimeter 64 which provides a digital readout in microamperes corresponding with the current generated by the solar cells and transmitted through the conductors 52 in response to the light image directed thereon.

In operation, the upper laser beam 20 crosses and is intercepted by the upper edge 4 of the sheet of paper 2. Simplex curl of the paper is measured by the beam casting a shadow on the upper solar detector 28. The shadow, which is defined by the light image projected on the detector, is the same length as the simplex curl. The presence of the shadow on the detector results in a reduction in the current generated by the detector since the light image cast on the detector is less than that cast when there is no obstruction of the light beam, such as for example when there is no simplex curl of the paper or when no paper is present. The amount of the current reduction from full exposure of the detector corresponds with the length of the shadow, and this amount is electrically subtracted from a reference setting within the comparison device 62 to produce an electrical difference reading on the meter corresponding with the simplex curl. If there is no simplex curl, no shadow is cast on the upper detector 28 since the paper is very thin in relation to the detector. Thus the display will read out the reference setting.

As set forth above, the lower edge of the sheet of paper is free to hang with its twist or diagonal curl unhindered. The lower laser beam 24 is directed against the lower edge 6 of the paper sheet, and a portion of the beam is obstructed by the diagonal and simplex curl of the sheet, thus casting a longer shadow on the lower detector 30 than is cast by the upper beam on the upper detector, if diagonal curl is present. The shadow on the lower detector is defined by the light image projected on the detector. The absence of light (i.e. the shadow) on the detector results in a reduced current being generated by the detector 30. The amount of the current reduction is electrically subtracted from the reference setting in the comparison device 62, and the readout on the meter 64 will be a function of both simplex and diagonal curl. The difference between the readout from the upper detector meter and the lower detector meter will thus be a measure of diagonal curl. If there is no difference, then no diagonal curl is present in the sheet being tested.

A direct readout of diagonal curl is possible by compensating for simplex curl detection. Using the readout from the upper detector measurement of simplex curl, the meter or meters connected with both detectors can be nulled by adjusting the potentiometers and the trimmer resistors of each circuit. Once nulled, the reading on the meter connected with the lower detector will be due solely to the diagonal curl.

The readout from the meter connected with the lower detector 30 will never be larger than the readout from the meter connected with the upper detector 28 if the instrument has been properly referenced. The only exception would be if the paper sheet is deformed, such as due to a bent corner or the like.

While the compensation device for the detectors is shown connected with a meter, the outputs may be connected directly with a recording device or with a computer for storage or further processing, respectively.

With the present invention, consistently accurate and standard measurements of both diagonal and simplex curl in a paper sheet are provided, thus eliminating the inefficiency and inaccuracy in curl testing resulting from prior subjective measurements.

While in accordance with the provisions of the Patent Statute the preferred forms and embodiments of the invention have been illustrated and described, it will be apparent to those skilled in the art that various changes and modifications may be made without deviating from the inventive concepts set forth above.

What is claimed is:

1. Apparatus for measuring the simplex and diagonal curl in a sheet of paper, comprising
   (a) a laser generator for producing a laser beam;
   (b) a line splitter connected with said laser generator for splitting said laser beam into a pair of beams of equal intensity;
   (c) reflector means connected with said line splitter for reflecting said beams in a vertically spaced parallel configuration;
   (d) means for vertically suspending a sheet of paper from its upper edge;
   (e) a pair of collimator lenses, one of said lenses being arranged in the path of each of said reflected laser beams, respectively, for producing laser beams having a given width and for directing said laser beams against both vertically spaced side edge portions of the sheet of paper in directions parallel with the planar surface of the sheet, wherein the sheet interrupts at least a portion of each of said laser beams to cast a shadow image from each beam; and
   (f) at least two detector means arranged adjacent the sheet for receiving and comparing said laser beams, respectively, the difference between said received laser beams corresponding with the diagonal curl of the sheet of paper.

2. Apparatus as defined in claim 1, wherein said detector means comprises at least one solar cell.

3. Apparatus as defined in claim 2, wherein a pair of solar cells are provided for receiving each image cast by the interruption of each laser beam by the sheet of paper.

4. Apparatus as defined in claim 3, and further comprising comparison means connected with said detector means for comparing said received laser beams with a reference, the difference between said received beams and said reference corresponding with the simplex curl at the vertically spaced portions of the sheet.

* * * * *